Sept. 27, 1966  E. W. FARMER  3,275,976
BOTTOM RELEASE MECHANISM FOR A SONOBUOY
Filed March 26, 1964  2 Sheets-Sheet 1

INVENTOR
Everett W. Farmer
BY Harold O. Williams

INVENTOR
Everett W. Farmer

United States Patent Office

3,275,976
Patented Sept. 27, 1966

3,275,976
BOTTOM RELEASE MECHANISM FOR A
SONOBUOY
Everett W. Farmer, Reeds Ferry, N.H., assignor to Sanders
Associates, Inc., Nashua, N.H., a corporation of Delaware
Filed Mar. 26, 1964, Ser. No. 354,944
13 Claims. (Cl. 340—2)

This invention relates to a water impact release mechanism for an air-launched electronic unit.

More particularly, this invention is directed to a release mechanism for a hydrophone array in a sphere-shaped sonobuoy which is ejected from a high speed aircraft which results in a high frequency shock loading to the surface of the sonobuoy and the release mechanism. The sonobuoy once launched from a high altitude, reaches a terminal velocity of many hundreds of feet per second, and this high velocity results in a tremendous shock force to be experienced by the sonobuoy's release mechanism upon water impact. Ideally, the sonobuoy should enter the water in an attitude that will locate the bottom of the buoy in water contact first. There are a number of external forces that come to play on the buoy while it is in flight and after the buoy has entered the ocean. Some of these forces are from the wind and weather at the site of the launching. On occasion, there may be some spin imparted to the sphere-shaped buoy at launching or due to air turbulence causing the buoy to enter the water at an improper attitude for optimum operation of the release mechanism and discharge of the buoy's contents. Should the buoy enter the water upside down, the release mechanism must withstand the tremendous G forces exerted thereon while having the capability of releasing the buoy's contents when a much lower drag force of lower frequency is applied to the buoy when the buoy's travel is stabilized to direct the bottom of the buoy towards the ocean floor.

The sonobuoy release mechanism must also have the capability of withstanding the inadvertent advent of mishandling which results in the buoy falling onto hard surfaces from varying heights without the release mechanism releasing the buoy's contents. The release mechanism of this invention also has the capability of releasing on water impact when the buoy is launched from a slow speed aircraft at very low heights, as well as from high speed aircraft at high heights.

All of these capabilities combined in a compact spherical buoy have heretofore been absent from prior art sonobuoys. The specific operation of a sonobuoy of the type involved with the invention to be described hereafter is set forth in copending application of Farmer, et al., filed March 26, 1964, Serial No. 354,946.

It is therefore an object of this invention to provide a sonobuoy with a water impact release mechanism for the hydrophone and related gear which will not function in the presence of high frequency shock forces other than direct water contact with the release mechanism, but will release at lower force levels having a low frequency.

Another object of this invention is to provide a sonobuoy hydrophone release mechanism that will only release the buoy's contents when the forces exerted thereon are dynamic hydraulic forces applied to the buoy's release mechanism.

Still another object of this invention is to provide a sonobuoy with a hydrophone array release mechanism that will not release when the sonobuoy is dropped on a hard surface from any height.

Another object of this invention is to provide a sonobuoy that can be launched from a high altitude, high speed aircraft without releasing the buoy's contents after contact with the open air after launch.

Another object of this invention is to provide a sonobuoy with a release mechanism for a hydrophone and related gear that is insensitive to changing atmospheric pressures.

Another object of this invention is to provide a sonobuoy with a release mechanism for a hydrophone array and related gear that will resist inadvertent actuation of the release mechanism during manual handling but will release upon a deliberate but elementary external physical manipulation.

For a better understanding of the present invention together with other and further objects thereof, reference is made to the accompanying drawings and its scope will be pointed out in the appended claims.

Figure 1:
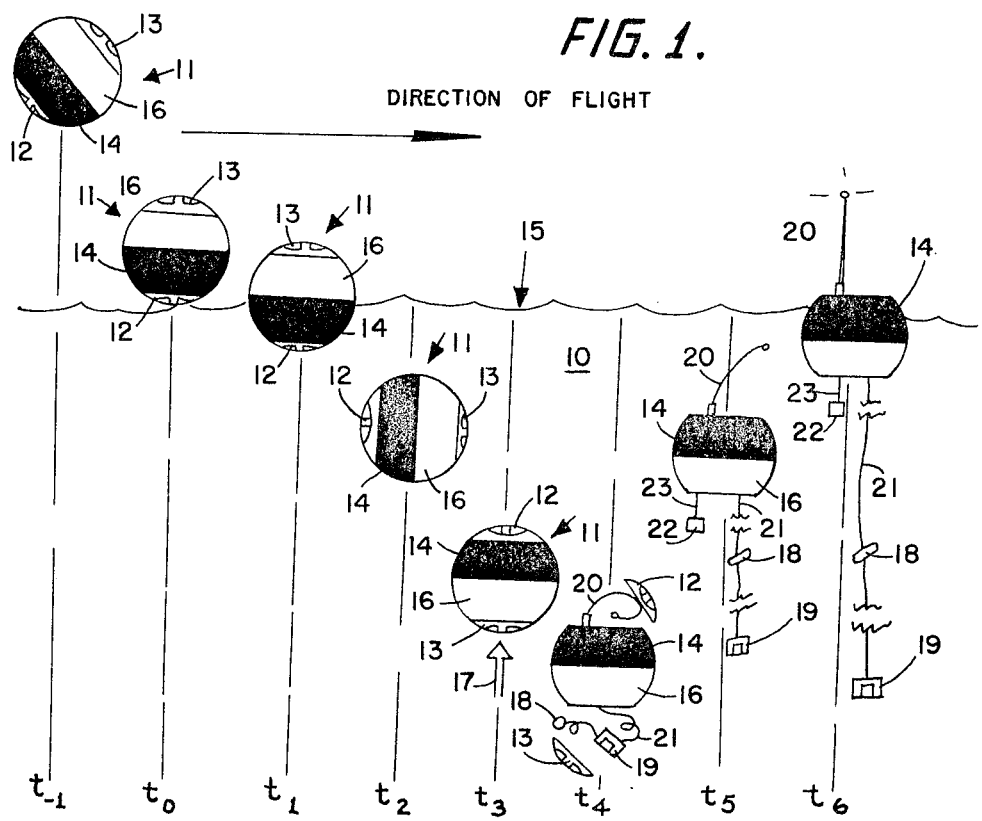
FIG. 1 depicts a schematic representation of a sonobuoy embodying the invention in a plurality of different positions after being launched.

Referring now to FIG. 1 where there is depicted a sphere-shaped sonobuoy 11 in eight different positions starting at the left hand side of the drawing and moving timewise to the right, the respective timed positions being noted below the figure $t_{-1}$ through $t_6$.

At time $t_{-1}$ the sphere-shaped buoy 11 is shown above the water 10 traveling downwardly towards the ocean surface 15. The buoy is comprised of four distinct components; namely, a bottom release cap 13 which is secured to a lower shell half 16 of the sphere-shaped buoy 11. The manner in which this bottom release cap functions will be described fully hereafter as it is the subject of the invention presented herewith. The upper half of this sphere-shaped buoy 11 is covered with an electrically conductive covering 14 which functions as a ground plane. The function of this ground plane is fully discussed in a copending application of Ballard, et al., filed March 26, 1964, Serial No. 354,985. Affixed to the side opposite the bottom release cap 13 is a finned stabilizer cap 12 which provides aerodynamic stability and also provides a stabilizing force to the buoy 11 after the buoy has entered the water 10. The finned stabilizer cap 12 coacts with the water 10 to produce a stabilizing couple force on the buoy 11 to cause the bottom release cap 13 to assume an attitude which will present the bottom release cap 13 towards the ocean floor or, in other words, the finned stabilizer cap 12 acts to turn the buoy 11 into a position such that the bottom release cap 13 is faced in the direction of travel of the buoy 11 as it passes through the water 10.

Figure 2:
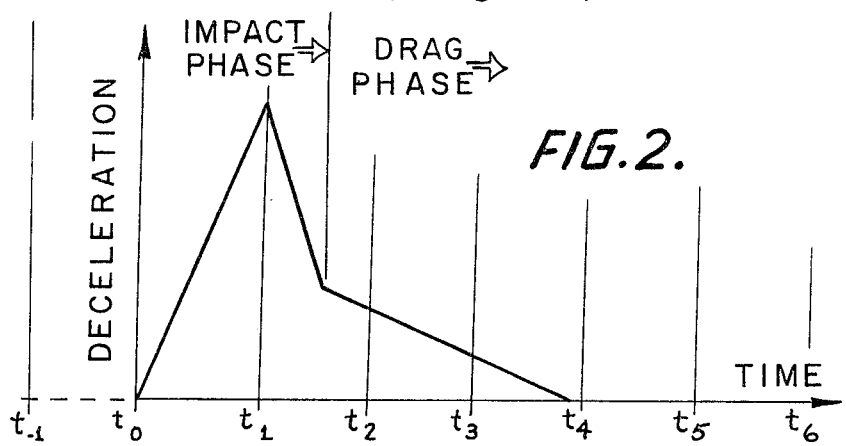
FIG. 2 is a graph depicting deceleration forces experienced by the buoy versus time.

At time $t_0$, the buoy 11 is shown striking the surface 15 of the water 10 at the most critical and unfavorable attitude in which a buoy of this type may enter the water; namely, upside down. When the buoy 11 strikes the surface 15 of the water 10, assuming a high altitude drop, its velocity is at many hundreds of feet per second and the resulting impact produces the maximum deceleration force that the buoy will withstand in all of its usage. If the buoy at the moment of water impact should release its bottom release cap 13, the subsequent entry and submersion into the ocean is likely to produce a severe tangling of the hydrophone and related depth selection equipment housed within the buoy in a manner not shown in these schematic showings. Simultaneously with the study of the buoy's entry into the ocean, a study should be made of the deceleration force versus time which is set forth in FIG. 2 directly beneath FIG. 1 for purposes of ready comparison. As can be seen when the buoy, as shown in FIG. 1, is half way submerged in the water 10 at time $t_1$, the buoy and all its contents including the release mechanism to be described more fully hereafter has received its maximum deceleration and accordingly its maximum shock loading due to water impact. As the buoy submerges itself due to its high entry velocity, the finned stabilizer cap 12 begins to coact with the ocean's environment to produce a couple force which tends to turn the buoy so that its ultimate attitude will be one at which the bottom release cap 13 is facing the direction of buoy travel through the water.

At time $t_3$, the buoy after a relatively short passage through the water 10 which in practice is only a few feet even if the buoy is dropped from altitudes in excess of 5,000 feet, the buoy has stabilized its direction of travel to an attitude at which the bottom release cap 13 is acted upon by a dynamic hydraulic water force designated by arrow 17. It is imperative as can be seen from a study of FIG. 2, that the buoy has assumed an attitude with the bottom release cap facing the direction of buoy travel. Whereas it will be explained more fully hereafter, the bottom release mechanism depends for its release action on a coaction between the hydraulic dynamic fluid force of the water 10 with the release mechanism housed within the bottom release cap 13.

At time $t_4$, the bottom release cap has freed itself from the lower shell half 16 of the buoy 11 and a hydrophone 18 which is serially connected to a weight 19 is shown passing into the depths of the ocean and maintaining a physical connection with the buoy 11 via the electrical suspension wire 21 which is unraveling from a cable suspension supply housed within the buoy and not shown.

The buoyancy of the sphere-shaped buoy at time $t_5$ has brought the buoy towards the surface 15 of the water 10. Simultaneously with the release of the bottom release cap, there is provided the automatic ejection of the stabilizer cap 12 through a mechanism not shown in these schematic drawings and which forms no part of the instant invention. The antenna 20 has a coil spring action and in unwinding it flips the stabilizer cap 12 free of the buoy preparatory to its full vertical erection to permit transmission of information from the ocean's depths when the buoy finally reaches the surface of the ocean 15 as shown at time $t_6$.

Housed within the buoy and released simultaneously with the hydrophone or hydrophones 18 is a salt water activated battery 22 which has its own battery suspension wire 23. This salt water activated battery 22 provides the power to drive a transmitter located within the buoy 11 to relay information obtained by the hydrophone 18 which has been lowered into the water to detect the underwater presence of submerged noise emitting bodies which are to be studied. The buoy 11 at time $t_6$ is shown floating partially submerged and the electrically conductive surface 14 of the buoy co-operates with the water that surrounds it to provide a highly efficient ground plane to assist in the transmission by the antenna 20.

Figure 3:
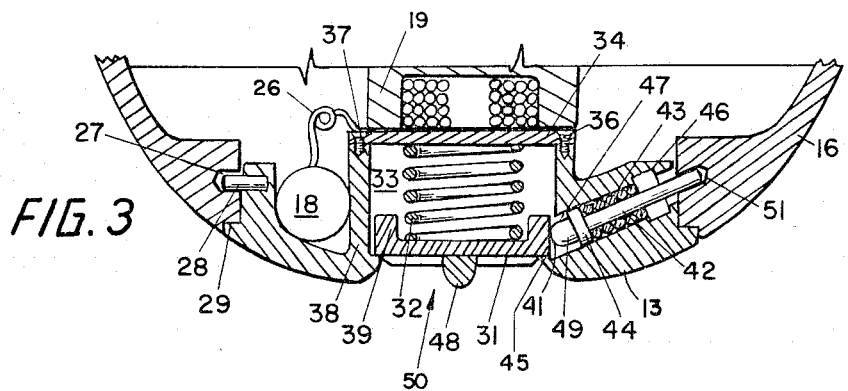
FIG. 3 is a sectioned illustration of the release mechanism embodying the invention.

Reference is now made to FIG. 3 which sets forth a partial schematic showing the lower shell 16 of a sonobuoy of the type depicted in FIG. 1. Securely fastened within the lower shell 16 is a bottom release cap 13 in which there is depicted the release mechanism which forms the subject of this invention. The bottom release cap 13 is preferably formed of a plastic which has been molded to the configuration presented in FIG. 3. At the center of the release cap 13 is a well shaped cavity 33. At the upper portion of the well, there is illustrated a well sealing plate 34 securely fastened to the side walls 38 of the well shaped cavity 33 by screws 36 and 37. Fitted within the well shaped cavity 33 is an impact release button 31 which is spring biased by spring 32 against a lip 45 and an impact button protective rib 48. The impact button protective rib 48 spans the opening 50 at the mouth of the well shaped cavity 33. The impact release button 31 has an upwardly projecting ridge at its periphery 39. It is this ridge 39 and impact release button 31 that forms a piston and cylindrical arrangement with the well shaped cavity 33 and its side walls 38.

As can be seen in FIG. 3 there is a region between the upwardly projecting ridge 39 of the impact release button 31 and the side walls 38 of the well shaped cavity 33. The spacing between the ridge 39 and the side walls 38 is important for it provides a passageway for air to communicate to the well shaped cavity of the bottom release cap 13. When the buoy has been ejected from a high speed aircraft and the impact release button 31 has received its inertial shock loading due to the pressure forces of the air exerted on the button 31, there is a partial depression of the spring 32 which holds the impact release button 31 in place. This partial depression of the spring 32 permits the passage of air around the sides of the impact release button 31 and into the well shaped cavity 33. At this point in time, the static pressure behind the release button 31, that is in the well shaped cavity 33, is equal to the dynamic pressure externally of the bottom release cap 13 and there is no further movement of the button 31. The bottom release cap mechanism is held securely in the lower shell 16 of the buoy by a hinge pin 28 which has been pressed into the bottom release cap 13 and co-operates with a hinge pin opening 27 in the lower shell 16. The entire bottom release cap 13 is fitted in a mating arrangement at a stepped lip 29 with the lower shell 16. The right hand side of the bottom release cap 13, as shown in FIG. 3, contains a bore 47 to house a cap release pin 42 and a related cap release pin spring 43 which rest on a spring retaining element 44 adjacent the end portion 49 of the cap release pin 42. The cap release pin spring 43 coacts with the retaining element 44 and a fixed spring retaining sleeve 46 to provide a constant biasing force on the cap release pin 42 to press the end portion 49 into frictional engagement with the upwardly projecting periphery ridge 39 of the impact release button 31. The end of the cap release pin 42 opposite the end portion 49 fits in sliding engagement with an opening 51 in the lower shell 16. Directly above the well sealing plate 34, there is a weight 19 which is interconnected by a wire 26 to a hydrophone 18 schematically depicted in this figure. The operation of the device upon water impact will now be described with reference to the illustration set forth in FIG. 4.

Figure 4:
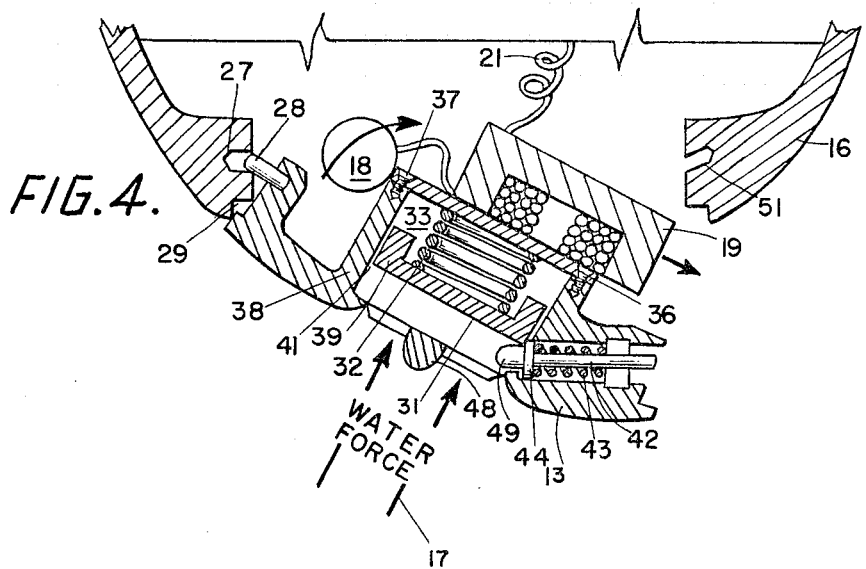
FIG. 4 is a sectioned illustration of the release mechanism embodying the invention a moment after the release mechanism has functioned.

The situation depicted in FIG. 4 is that of just a moment after the buoy 11, as shown in FIG. 1, has reached time $t_3$ and the water force 17 is acting directly on the impact release button 31. In this circumstance there is no time or space sufficient for the water of the ocean to enter and pass around the sides of the impact release button 31 and therefore the full water loading force is impressed on the impact release button 31 and the release button 31 is pressed upwardly against the restraining force of the spring 32 to the upper portion of the well shaped cavity 33. In so traveling, the impact release button 31 permits the cap release pin 42 which is spring biased to move to the left as seen in FIG. 4 and in so moving the end portion 49 of the release pin 42 assumes a position underneath a corner of the impact release button 31 and the entire cap release pin 42 is now released from the release pin opening 51 of the lower shell 16. Simultaneously with this release, the weight 19 and related hydrophone 18 due to their weight and the pivoting action of the hinge pin 28 start their descent into the ocean.

While not shown in the drawings, there is present an additional spring force downwardly on the weight 19 to further assist the total ejection of the bottom release cap 13.

The size and weight of the impact release button 31 and the spring 32 requires special selection to provide a button that has a low inertial value so that tremendous high frequency shock loadings to this impact release button is damped by a combination of the spring action presented by spring 32 and the air trapped within the well shaped cavity 33. Of particular importance in the handling of this type of a buoy arrangement is the presence of an impact button protective rib 48 which is depicted in section in FIGS. 3 and 4 and spans the opening 50 of the bottom release cap 13 to provide a physical barrier to the inadvertent touching of the impact release button 31 during handling. The opening of the bottom release cap 13 provides sufficient area for the dynamic hydraulic water forces to act thereon to facilitate the depression of the spring 32 and effect the release of the cap as shown in FIG. 4. The opening 50 also provides a ready access to allow the calculated depression of the impact release button 31 by some manual insertion of a tool such as a screwdriver or pointed object. In some instances this protective rib may be removed and the opening 50 can be covered by a thin adhesive sheet (not shown) to thereby provide the needed protection of the button 31. Of course, the adhesive layer would have to be removed prior to launching.

While there has been hereinbefore described what are at present considered preferred embodiments of the invention, it will be apparent that many and various changes and modifications may be made with respect to the embodiment illustrated, without departing from the spirit of the invention. It will be understood that all changes and modifications as fall fairly within the scope of the present invention, as defined in the appended claims, are to be considered as part of the present invention.

What is claimed is:
1. A water impact release mechanism for an air-launched electronic unit having a housing comprised of:
  (A) a releasable cap mounted on said unit, said cap member having a well-shaped cavity therein,
  (B) a spring biased impact button mounted for reciprocation within said cavity,
  (C) said cap having a bore opening communicating with said well-shaped cavity,
  (D) a cap release pin slidably mounted within said bore and movable to a first and second position whereby wherein said release pin is in said first position and said pin engages a portion of said housing to thereby hold said cap in place until water impact,
  (E) said cap release pin having an end portion in frictional engagement with the periphery of said button, said impact button providing a stop for said release pin to prevent said pin from assuming said second position, and
  (F) said spring biased button being movable against said spring bias upon impact with said water to permit said pin to move into said second position and out of said first position whereby said release pin is disengaged from said housing to permit the release of said cap from said housing.

2. A water impact release mechanism for an air-launched electronic unit's contents having a housing comprised of:
  (A) a bottom cap mounted on said housing to hold said electronic unit's contents within said housing until said water impact,
  (B) an air damped release button mounted within said bottom cap,
  (C) said air damped release button having a low moment of inertia to thereby resist movement as a result of sudden high frequency shock loading, and
  (D) said air damped release button being movable to a released position under the presence of a dynamic water pressure directed against said button upon said water impact, and release means activated by said button in its release position to allow the release of said housing's contents.

3. The combination set forth in claim 2 wherein said bottom cap has a cavity therein in which said release button is mounted for movement between a bottom cap unreleased position and a bottom cap release position.

4. The combination set forth in claim 3 wherein said release button is spring biased toward said bottom cap's unreleased position to thereby aid said air damping of said release button against sudden high frequency shock forces.

5. The combination set forth in claim 3 wherein said bottom cap has an opening communicating with said air damped release button and said housing, and wherein said release means comprises:
  (A) a cap release pin mounted within said opening and movable to a first and second position corresponding to said bottom cap unreleased position and said bottom cap released position whereby when said release pin is in said first position said pin engages a portion of said housing to hold said bottom cap in place until water impact.

6. The combination set forth in claim 5 wherein said cap release pin has an end in frictional engagement with said release button,
  (A) said release button providing a stop for said release pin to prevent said pin from assuming said second position.

7. The combination set forth in claim 6 wherein said movable release button upon said water impact moves to said second position whereby said release pin is disengaged from said housing to permit the release of said cap from said housing, thus allowing said housing's contents to move downwardly and outwardly therefrom.

8. The combination set forth in claim 2 wherein there is provided a means to protect said release button from inadvertent manual contact during handling prior to said air launch.

9. A water impact release mechanism for an air launched sonobuoy's contents from said sonobuoy comprised of:
  (A) a bottom cap mounted on said sonobuoy to retain said sonobuoy's contents within said housing until said water impact,
  (B) an air damped release button having a low moment of inertia mounted within said bottom cap and movable to a release position under the pressure of a dynamic water force upon said water impact, said air damped release button's low moment of inertia thereby providing said release button with the ability to resist high frequency, short duration, shock forces without moving to said release position, and release means activated by said button in its release position to allow the release of said housing's contents.

10. The combination set forth in claim 9 wherein said bottom cap has a cavity therein and said release button is mounted within said cavity for movement between a bottom cap unreleased position and a bottom cap release position, said release button co-operating with the air in said cavity to thereby provide said air damping,
  (A) said release button being spring biased toward said bottom cap's unreleased position to thereby aid said air damping of said release button against sudden high frequency shock forces but yielding to a continuous dynamic hydraulic water force upon said water impact.

11. A water impact release mechanism for an air-launched electronic unit's contents having a housing comprised of:
  (A) a bottom cap mounted on said housing to hold said electronic unit's contents within said housing until said water impact, said cap having a well-shaped cavity therein,
  (B) a release button disposed within said cavity and slightly spaced from the walls thereof for reciprocation therewithin, thereby causing said release button to be air damped,
  (C) said air damped release button having a low moment of inertia to thereby resist movement as a result of sudden high frequency shock loading, and
  (D) said air damped release button being movable to a released position under the presence of a dynamic water pressure directed against said button upon said water impact, and release means activated by said button in its release position to thereby allow the release of said housing's contents.

12. The combination set forth in claim 11, wherein said bottom cap has an opening communicating with said air damped release button and said housing, and wherein said release means comprises:
(A) a cap release pin mounted within said opening and movable to first and second positions corresponding to a bottom cap unreleased position and a bottom cap release position, respectively,
(B) whereby when said release pin is in said first position, one end of said pin is in frictional engagement with said release button and the other end of said pin engages a portion of said housing, said one end of said pin being engaged by said release button to provide a stop for said release pin to prevent said pin from assuming said second position, thereby holding said bottom cap in place until water impact.

13. The combination set forth in claim 12, wherein said release button moves to said second position upon water impact, whereby said release pin is disengaged from said release button and from said housing to permit the release of said cap from said housing, thus allowing said housing's contents to move downwardly and outwardly therefrom.

References Cited by the Examiner

UNITED STATES PATENTS

| | | | |
|---|---|---|---|
| 2,323,064 | 6/1943 | Lustfield | 343—709 X |
| 2,586,828 | 2/1952 | Keeran | 9—8 |
| 3,074,671 | 1/1963 | Dinolfo et al. | 244—138 |
| 3,132,322 | 5/1964 | Maes | 340—2 |

CHESTER L. JUSTUS, *Primary Examiner.*

R. A. FARLEY, *Assistant Examiner.*